Sept. 21, 1954 H. B. MATHENY 2,689,572

VISIBLE CARD INDEX

Filed Feb. 29, 1952

INVENTOR.
HOLLIS B. MATHENY

BY George V. Eltgroth

Roland T. Bosch

ATTORNEYS

Patented Sept. 21, 1954 2,689,572

UNITED STATES PATENT OFFICE 2,689,572

VISIBLE CARD INDEX

Hollis Burnette Matheny, Bronxville, N. Y., assignor to Remington Rand Inc., New York, N. Y., a corporation of Delaware Application February 29, 1952, Serial No. 274,124

2 Claims. (Cl. 129—16.7)

This invention relates to improvements in card record or indexing devices and is more particularly concerned with that type of card record or index in which a plurality of card holders having lower transparent margins are supported substantially flatwise in series and in such overlapping nested relationship that the lower edge of each successive holder projects below the next in succession so that marginal indexing or other record data may be visibly displayed by the transparent margin with respect to a card held by the card holder. In modern business usage it is common practice to utilize such card holders to carry more than one record or reference card. For example, a master card may be used with sub-cards or riders, all pertaining to the same information or record and all carried by a single card holder. In some such business usages having plural cards in each card holder, it is desirable to be able to periodically and completely remove one or more of the riders or sub-cards, for adding additional information thereto, without disturbing the master card in any way and with some installations ready removal of the riders has been difficult if the danger of removing or displacing the master card is to be avoided. In other words, if a rider or like sub-card is carelessly grasped, this may result in simultaneous grasping of the master card and the accidental removal or disturbance thereof when removing the sub-card or rider. Obviously this procedure should be avoided since it may cause the riding up of the lower index margin so that the indexing thereon is no longer visible through the transparent portion of the card holder or it may cause complete removal from the card holder of the index master card. The dislodging or loss of the master card from a complete index record can create a very vital problem and since unskilled or careless personnel may handle such record or files the present invention contemplates providing a new and useful improvement in card index file systems where multiple card filing in each card holder is utilized without the danger of disturbing the master card when a sub-card or rider is removed.

Generally, in practicing the present invention there is provided a card holder of the type referred to having conventional angular slots therein for receiving cards and holding them in flat position in conjunction with the conventional marginal lower transparent pocket and a master card having its upper edge cut away between the corner marginal portions or tabs which engage with said angular slots whereby the major portion of the upper edge of said master card will not coincide with the upper edge of a sub-card or rider also inserted in said slots but will be lower in height than the height of said rider, in order that it may be possible to remove the overlying sub-card or rider from the slots and from the pocket, and withdraw same from the card holder without disturbing the master card there-beneath. Preferably, the marginal portion of the upper edge of the master card is not fully cut away but some portions left as tongues which are introduced into transverse slots in the card holder thereby holding the master card flat on the card holder while still maintaining the upper edge of the master card below the level of the edge of a sub-card or rider placed thereover.

Specifically, there is provided a master card for cooperation and use with a conventional card holder of the type described having transverse and angular slots therein to accommodate and hold cards thereon, the master card comprising a substantially rectangular card member having its upper edge cut away a various portion to reduce the original height thereof, the valleys being such that tabs are left upstanding for interlocking with both the angular and transverse slots of the card holder to hold the master card thereon, while the effective height of the master card, when so held on the card holder, is reduced so that any sub-card or rider overlying same and of height equivalent to the original height of the master card, will have an upper marginal portion which is free of register with the master card, whereby the sub-card may be readily grasped at this marginal portion and removed from the card holder without danger of disturbing or removing the underlying master card.

The invention will now be described with respect to the accompanying drawing illustrating one embodiment of the present invention and in which Fig. 1 is a front view of a card holder unit with both a master card and a rider or sub-card in secured position, with parts cut away for clarity, illustrating one embodiment of the present invention;

Figure 1:
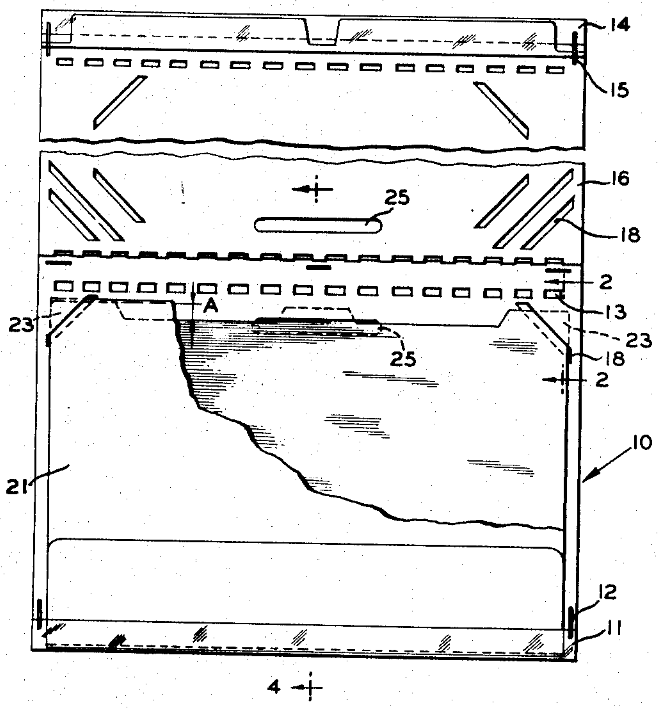
Figure 2:
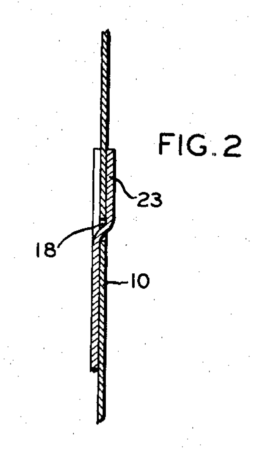
Fig. 2 is an enlarged cross-sectional detail on the lines 2—2 of Fig. 1.

Referring now specifically to the drawings, a card holder generally shown at 10, is formed of a rectangular piece of card stock and is provided at its lower end or marginal edge with a transparent pocket 11 formed of a fold of transparent material which is stapled, as at 12, to the stock 10, to form a lower receiving pocket for the card or cards to be held by the card holder. At its upper marginal edge card holder 10 is provided with a plurality of closely spaced narrow slots 13, longitudinally arranged across the body of the card holder in order to form a hinge by folding the card holder at this marginal portion across said slots. A reinforcing strip 14 is stapled to the marginal edge of the holder 10 to serve as a hinge support. As particularly shown in Fig. 4, a second card holder 16 similar in construction to card holder 10, hingedly attached to a strip 17, may be provided, the two strips 14 and 17 being suitably connected together in staggered formation as shown, whereby the lower marginal transparent pockets 11 of each of the card holders 10 and 16 will be exposed to view and a plurality of card holders 10 and 16 may be nested the one with respect to the others in sequential arrangement to form an index unit. Any number of card holders similar to 10 and 16 may be utilized to form a complete indexing means for a plurality of records in the conventional manner. In order to secure a card of any desired type within the card holder there is provided a plurality of angularly arranged slots 18 of conventional form in both the card holder 10 and the card holder 16, these slots being located on the card holders for cooperation with the corners of the various rectangular shaped cards to be carried within the card holder. Thus a record card of any desired form may be inserted with its lower marginal edge in the pocket 11 and the upper corners thereof may be inserted below and through the slots 18 whereby the card will be held flat in a manner which is usual with this type of visual index file card device.

Figure 3:
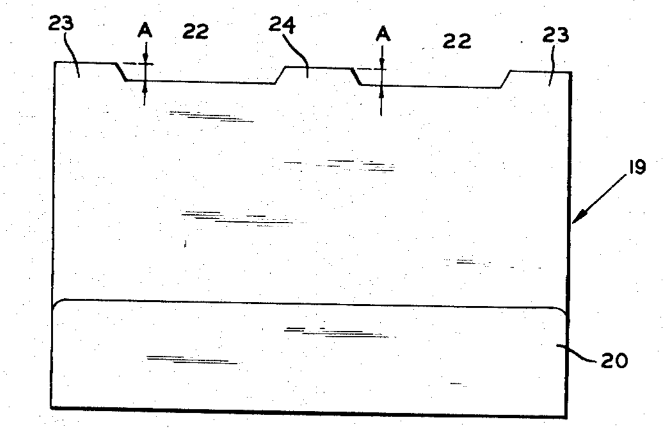
Fig. 3 is a front elevation of a master card according to the present invention.
Figure 4:
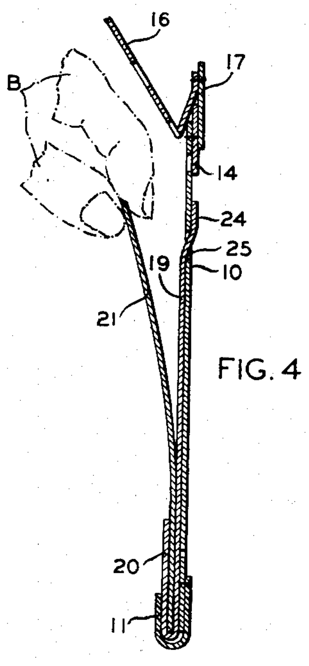
Fig. 4 is a cross-sectional view of the master card holder and rider or sub-card taken on the lines 4—4 of Fig. 1.

In accordance with the present invention there is provided a unique form of master card, shown at 19 in Fig. 3 particularly, which master card is adapted to be carried by the card holder 10 and held therein by means of the pocket 11 and the slots 18. This specific form of master card 19 illustrated is of general rectangular conformation with a folded lower margin which forms a pocket 20 for receiving or holding the lower end or marginal edge of a sub-card or rider 21, when the master card is in position in the card holder with its marginal fold 20 housed within the pocket 11. The upper marginal portion of the master card 19 does not present a uniform or level edge but is cut away as shown at 22 leaving two laterally arranged projecting corner tabs 23 which are adapted to cooperate with the slots 18, as particularly shown in Fig. 1. Thus the upper edge of the master card 19 is reduced in height between the two tabs 23 by the distance A shown on Fig. 3. Since a sub-card or rider 21 will occupy the same slots 18 as that chosen for the particular master card 19 and since the upper edge of the sub-card or rider is maintained continuous, it therefore follows that the upper edge of the rider 21 will be spaced away from the major portion of the upper edge of the master card 19 by this distance A, this being clearly shown in Fig. 1 the height of the master card 19 being less than the height of rider 21. Therefore, when an operator decides to remove the rider 21 from engagement with the slots 18 and from engagement 2 with the inside of the fold 20 of the master card 19, he will readily be able to separately grip the upper edge of the rider 21, as shown in Fig. 4, where the fingers B are grasping the card or rider 21, whereby this may be readily removed without any danger of disturbance of the master card 19. It is obvious that if the upper edges of the master card 19 and the rider 21 are coextensive or of equal height, removal of the rider 21 by fingers B may tend to take with it the master card 19 by grasping both cards simultaneously and either remove the master card completely or lift same partially away from the slots 18 and remove the fold 20 from the pocket 11. Since the record indicia will be on the front of fold 20, such removal or disturbance would be harmful. Accordingly, the provision of the cut aways 22 and the reduction of the height of the master card 19 by the distance A through the majority of its length serves to permit the rider 21 to be removed readily and easily, without danger of any disturbance of the master card 19.

As is obvious, it is extremely desirable that the master card 19 shall lay flat particularly in its center section, to assist this ready removal of the rider 21 which lays above same since the average operator will remove the rider 21 by grasping it at a substantially central section, provision is, therefore, made, as a preferable feature of this invention, to maintain the master card 19 flat at its center section, namely, in that section where there is more likelihood of disturbance or danger of grasping both cards when removing the card 21.

To this end there are provided on the upper edge of the master card 19 suitable tongues 24, a single central tongue only being shown in Fig. 3. It is obvious, however, that a plurality of said tongues can be provided within the spirit and scope of the present invention, in order that the card 19 may lay flat. Tongue 24 is formed as an upstanding tab or hill between the valleys 22 which are the cut aways of the card and is adapted to cooperate with a suitably arranged slot 25 cut transversely through the body of the master card holder 10. The length of the slot 25 and its positioning with respect to the upper end or edge of the card 10 is such that the tongue 24 can be seated therein and the lower edge of the valleys or cut aways 22 can be substantially seated against the upper edges of said slots 25. It will be obvious that by this means the master card 19 will be held flat by the association of the tabs 23 with slots 18 and the tongue 24 with the slot 25 and particularly the center section of the master card 19 will be maintained in a substantially flat condition and will be retained against accidental withdrawal from the card holder 10 when a rider or sub-card 21 is removed, as shown in Fig. 4. Moreover, it will be obvious that because of the physical contact of the edges of the valleys 22 with the upper edges of the slot 25, the tendency for the center of the card 19 to ride up, and thus to disturb the placement of the fold 20 within the pocket 11, is overcome whereby, even if the card 21 is roughly pulled from its position in the fold 20, it will not cause the outer portion of the fold 20 which is exposed by the pocket 11 to be pulled out of indexing position.

By the provision of the cut away 22 to form a plurality of valleys in the upper edge of the master card 19 it is thus possible to avoid the accidental withdrawal of the master card 19 when the sub-card 21 is removed by withdrawal of the tongues 24 and/or tabs 23 from their respective slots. Also by provision of one or more of the tongues 24 cooperating with one or more slots 25 in the body of the card holder 10, it is possible to further remove the possibility of disturbance of the master card when the card 21 overlying same is withdrawn and also to prevent the riding up of the master card 19 and thus the removal of the outer marginal portion of the fold 20 which has record indicia thereon from the visible pocket 11, whereby a new card holder and card combination is provided having obvious advantages in use and contributing to the efficiency of any card indexing system of the type referred to.

What is claimed is:

1. In a card record of the type referred to, an index unit comprising in combination, a card holder having angular marginal slots for receiving and holding cards thereon, a transparent pocket across the lower edge, a hinge across the upper edge and a long transverse slot substantially centrally arranged on the card holder body and spaced below the hinge by a predetermined amount; a master card having a marginal tab at each upper corner for engagement with said angular slots in the card holder, to hold said master card in position on said card holder with the lower marginal edge of the master card engaged in said transparent pocket, a tongue formed on the upper edge of said master card in position to engage and interlock with said transverse slot to hold the central portion of the master card flat, and cut away valleys on either side of said tongue between said tongue and said tabs, to lower the height of the exposed portions of said master card below the upper edge of said tongue and tabs; and a sub-card of height substantially equivalent to that of the master card between its lower edge and the upper edge of said tabs and tongue, whereby said sub-card, when interlocked on said card holder in said angular slots and visible pocket and overlying said master card interlocked on said card holder by said tabs, tongue and slots, may be readily removed from said card holder without removing or disturbing said master card.

2. In a visible index, the combination of a card holder having a holder sheet formed with a hinge portion on one margin thereof, a transparent tip embracing the opposite margin of said holder sheet and attached thereto, said holder sheet having a pair of diagonal corner slots at opposite sides adjacent said hinge and an intermediate slot between said corner slots adjacent said hinge, a pair of cards of uniform size mounted in superimposed coincident relation on said holder sheet with one margin engaged in said tip and the opposite corner portions engaged in the same pair of corner slots and detachably mounting both cards on said holder sheet, the card next to said holder sheet having a pair of intermediate marginal portions between said corner portions removed to form a tongue slidably engaged in said intermediate slot in said holder sheet and edge portions between said tongue and corner portions offset from the corresponding edge portions of the outermost card, whereby the outermost card may be manually engaged along said corresponding edge portions and removed from said card holder without disturbing said first-mentioned card while said tongue cooperates in holding said first-mentioned card and aids in the manual removal of said outermost card.

References Cited in the file of this patent

UNITED STATES PATENTS

| Number | Name | Date |
|---|---|---|
| 1,209,819 | Dumont | Dec. 26, 1916 |
| 1,310,468 | Best | July 22, 1919 |
| 1,508,779 | Dumont | Sept. 16, 1924 |
| 1,658,393 | Rand | Feb. 7, 1928 |
| 1,856,388 | Hutchings | May 3, 1932 |

FOREIGN PATENTS

| Number | Country | Date |
|---|---|---|
| 326,667 | Great Britain | 1930 |